US009232451B2

(12) United States Patent
Murphy et al.

(10) Patent No.: US 9,232,451 B2
(45) Date of Patent: Jan. 5, 2016

(54) UNTETHERED ACCESS POINT MESH SYSTEM AND METHOD

(71) Applicant: Trapeze Networks, Inc., Pleasanton, CA (US)

(72) Inventors: James Murphy, Pleasanton, CA (US); Gary Eugene Morain, San Jose, CA (US); Stan Chesnutt, Berkeley, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 0 days.

(21) Appl. No.: 14/468,079

(22) Filed: Aug. 25, 2014

(65) Prior Publication Data

US 2014/0364130 A1  Dec. 11, 2014

Related U.S. Application Data

(62) Division of application No. 11/801,964, filed on May 11, 2007, now Pat. No. 8,818,322.

(60) Provisional application No. 60/812,403, filed on Jun. 9, 2006.

(51) Int. Cl.
*H04W 40/00* (2009.01)
*H04W 36/08* (2009.01)
*H04W 12/06* (2009.01)
*H04W 84/22* (2009.01)
*H04W 84/18* (2009.01)
*H04W 88/14* (2009.01)

(52) U.S. Cl.
CPC .............. *H04W 36/08* (2013.01); *H04W 12/06* (2013.01); *H04W 84/22* (2013.01); *H04W 84/18* (2013.01); *H04W 88/14* (2013.01)

(58) Field of Classification Search
USPC .......................... 455/503, 403, 561, 445, 85
See application file for complete search history.

(56) References Cited

U.S. PATENT DOCUMENTS

| 7,587,750 | B2 * | 9/2009 | Zimmer et al. | 726/2 |
|---|---|---|---|---|
| 7,685,295 | B2 * | 3/2010 | Myers et al. | 709/228 |
| 2002/0083316 | A1 * | 6/2002 | Platenberg et al. | 713/2 |
| 2004/0215665 | A1 * | 10/2004 | Edgar et al. | 707/200 |
| 2004/0268140 | A1 * | 12/2004 | Zimmer et al. | 713/200 |
| 2005/0009565 | A1 * | 1/2005 | Kwak | 455/561 |
| 2005/0010811 | A1 * | 1/2005 | Zimmer et al. | 713/201 |
| 2005/0250487 | A1 * | 11/2005 | Miwa et al. | 455/422.1 |
| 2005/0256963 | A1 * | 11/2005 | Proctor, Jr. et al. | 709/230 |
| 2006/0152344 | A1 * | 7/2006 | Mowery, Jr. | 340/310.11 |
| 2007/0021126 | A1 * | 1/2007 | Nanda et al. | 455/456.1 |

* cited by examiner

*Primary Examiner* — Joseph Arevalo (57) ABSTRACT

A technique for implementing an untethered access point (UAP) mesh involves enabling AP-local switching at one or more UAPs of the mesh. A system constructed according to the technique may include a wireless switch; an access point (AP) wire-coupled to the wireless switch; and a UAP mesh, wirelessly coupled to the AP, including a UAP with an AP-local switching engine embodied in a computer-readable medium. Another system constructed according to the technique may include an untethered access point (UAP), including: a radio; a backhaul service set identifier (SSID) stored in a computer-readable medium; an anchor access point (AAP) selection engine embodied in a computer-readable medium. In operation, the AAP selection engine may use the radio to attempt to associate with the AAP if a beaconed backhaul SSID matches the stored backhaul SSID. A method according to the technique may include beaconing with a backhaul SSID; acting in concert with an upstream switch as an authenticator for a downstream station that responds to the beacon; providing limited local switching functionality for the downstream station.

17 Claims, 5 Drawing Sheets

UNTETHERED ACCESS POINT MESH SYSTEM AND METHOD

CROSS-REFERENCE TO RELATED APPLICATIONS

This application is a divisional of U.S. patent application Ser. No. 11/801,964, filed on May 11, 2007, which claims the benefit of U.S. Patent Application No. 60/812,403, filed Jun. 9, 2006, each of which is hereby incorporated by reference.

BACKGROUND

An access point (AP) is a device used by wireless clients to connect to a network. An AP functions as a standalone entity in some implementations and functions in cooperation with distribution hardware in other implementations. Distribution hardware may include a wireless switch used to manage APs and provide network-connectivity to wireless clients. A wireless domain may refer to a group of wireless switches that are configured to exchange relevant information, and using this information make informed decisions. A known device is a station (e.g., a wireless AP or client device) that is part of a network wireless installation.

Trapeze Networks, Inc. (Trapeze), uses a MOBILITY POINT™ (MP®) APs in a MOBILITY DOMAIN™ wireless domain. An MP® AP is coupled to a MOBILITY EXCHANGE® (MX®) wireless switch. Trapeze uses MOBILITY DOMAIN™ to refer to a collection of MX® switches. This collection of MX® switches shares RF environment and station association information. This information is used by the MX® switches to support features including by way of example but not limitation roaming, auto channel selection, rogue AP detection, intrusion detection and/or the launching of countermeasures. Some additional details regarding the Trapeze-specific implementation is provided by way of example but not limitation, including novel features that are discussed later in this application, in the provisional application to which this application claims priority.

In a typical implementation, APs are coupled to a switch via a wire. Implementations that include untethered APs (UAPs), introduce additional configuration difficulties that are only recently being explored. This is an area that is ripe for experimentation and innovation because it has proven challenging to find a way to scale wireless domains using UAPs.

These are but a subset of the problems and issues associated with wireless access point authentication, and are intended to characterize weaknesses in the prior art by way of example. The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for implementing an untethered access point (UAP) mesh involves enabling AP-local switching at one or more UAPs of the mesh. A system constructed according to the technique may include a wireless switch; an access point (AP) wire-coupled to the wireless switch; and a UAP mesh, wirelessly coupled to the AP, including a UAP with an AP-local switching engine embodied in a computer-readable medium. The system may or may not further include a wired backbone coupled to a wired network including the wireless switch. The UAP mesh may or may not be self-healing. A spanning-tree algorithm may or may not be embodied in a computer readable medium of the UAP mesh. The wireless switch may or may not include an authorization engine, embodied in a computer-readable medium, for acting in concert with an anchoring AP to authorize a downstream station. The AP-local switching engine may or may not make use of a station switching record (SSR) stored a the UAP.

Another system constructed according to the technique may include an untethered access point (UAP), including: a radio; a backhaul service set identifier (SSID) stored in a computer-readable medium; an anchor access point (AAP) selection engine embodied in a computer-readable medium. In operation, the AAP selection engine may use the radio to attempt to associate with the AAP if a beaconed backhaul SSID matches the stored backhaul SSID. The UAP may or may not further include a bootable image stored in a computer readable medium, wherein, in operation, the UAP boots up using the bootable image. The UAP may or may not use regulatory domain information to ensure the UAP is operating within regulatory limits before receiving a complete configuration. The AAP selection engine may or may not listen for a beacon from an AAP that includes the backhaul SSID. The AAP may or may not include a backhaul SSID stored in a computer-readable medium. The AAP may or may not include an authentication engine embodied in a computer-readable medium, wherein, in operation, the authentication engine works in concert with upstream components to authenticate the UAP. The AAP may or may not include a backhaul radio; a backhaul radio and service profile stored in a computer-readable medium; wherein, in operation, when the UAP is associated to the AAP, the backhaul radio sends messages from the UAP upstream using the backhaul radio and service profile. The AAP may or may not be configured to anchor the UAP and a limited number of additional UAPs.

A method according to the technique may include beaconing with a backhaul SSID; acting in concert with an upstream switch as an authenticator for a downstream station that responds to the beacon; providing limited local switching functionality for the downstream station. The method may or may not further include sending a station switching record (SSR) from the upstream switch to the downstream station; receiving the SSR from the downstream station; storing the SSR locally and sending the SSR upstream to a next upstream hop. The method may or may not further include receiving in an initial configuration the backhaul SSID; listening for a beacon with the backhaul SSID; attempting to associate with an anchoring AP that is beaconing with the backhaul SSID; if association is successful, receiving a station switching record (SSR) from the upstream switch, storing the SSR locally, and passing the SSR upstream.

The proposed system can offer, among other advantages, improved wireless domain scaling capabilities. This and other advantages of the techniques described herein will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
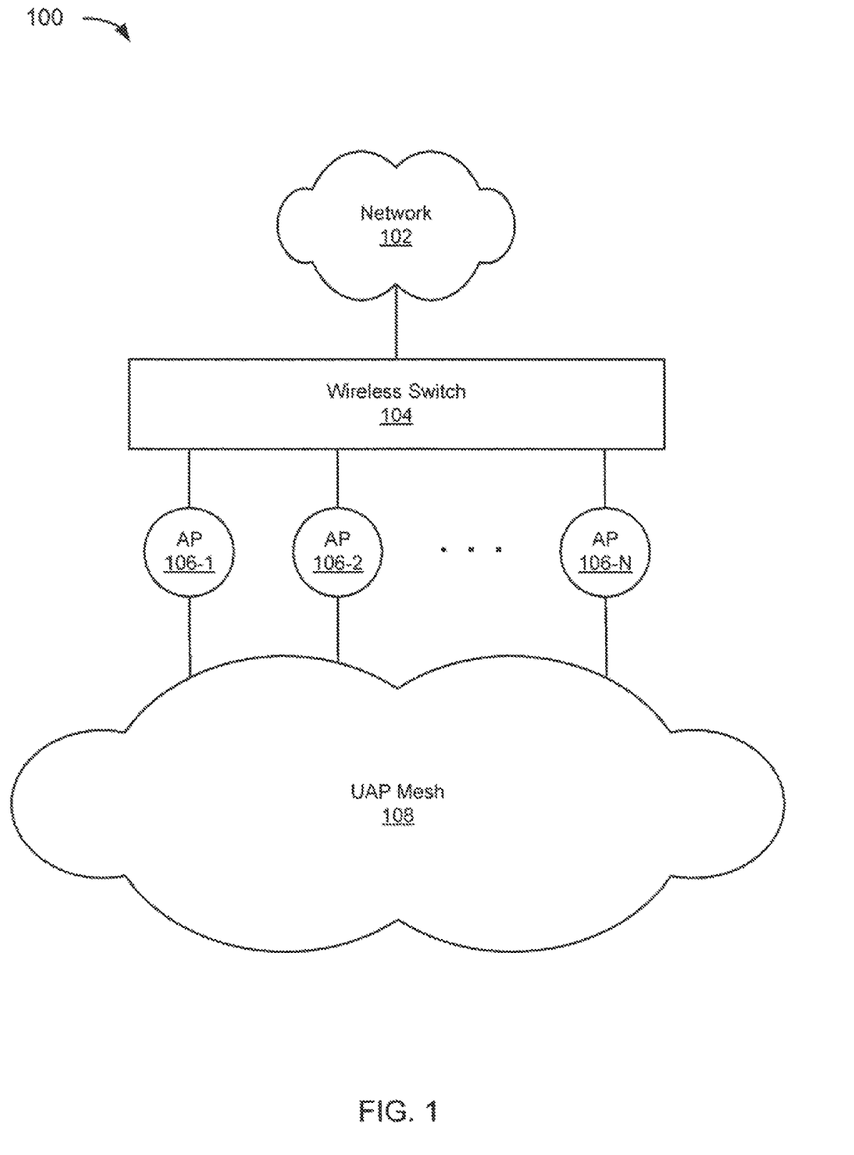
FIG. 1 depicts an example of a system including an untethered access point (UAP) mesh.

FIG. 1 depicts an example of a system 100 including an untethered access point (UAP) mesh. In the example of FIG. 1, the system 100 includes a network 102, a wireless switch 104, one or more APs 106-1 to 106-N (referred to collectively as APs 106), and a UAP mesh 108.

The network 102 may include an Internet protocol (IP) network. In an embodiment, the network 102 is a wired backbone to which the wireless switch 104 is coupled. However, the network 102 may alternatively represent the network, or any other network, to which a backbone network is coupled or which acts as an alternative to a backbone network. Thus, the network 102 could include, for example, the Internet.

The wireless switch 104 is typically wire connected to the APs 106. Thus, the "wireless" switch could be thought of, depending upon the implementation, as a switch for wireless traffic to and/or from a wired network. The wireless switch 104 is not necessarily wirelessly connected to anything. Each of the APs 106 could be wire coupled to respective switches such that each switch is wire coupled to only a single AP. So, although the one or more APs 106 is depicted as a plurality in the example of FIG. 1, it should be understood that the number of APs per switch is implementation- and/or embodiment-specific. An AP and the wireless switch 104 could be combined into a single device. However, in this description, the functionality of an AP is differentiated from the functionality of a switch by acting as if the APs and the wireless switches are distinct devices.

The wireless switch 104 may or may not have all of the tools to manage wireless stations and the UAP mesh locally. For example, there may be additional management (e.g., AAA servers) further upstream from the wireless switch 104. Since it is not critical where these services take place beyond the wireless switch 104, for illustrative simplicity, it is assumed that the wireless switch 104 handles all of these functions, either locally or by utilizing upstream components. For this reasons, the figures (other than FIG. 1) do not depict components further upstream from the wireless switch 104.

Wireless data may include, by way of example but not limitation, station association data and RF environment data. The station and RF data is used by the wireless switches 104 to support features including, by way of example but not limitation, roaming, auto channel selection, rogue AP detection, intrusion detection and the launching of countermeasures. The wireless switch 104 may share wireless data with other wireless switches (not shown).

The wireless switch 104 controls the APs 106 (and the APs in the UAP mesh 108). In an embodiment, the APs 106 include radio transmitters and receivers (e.g., transceivers) that are used to provide wireless network connectivity for users and station access to the functions of the wireless switch 104. Within an IEEE 802.11 context, a station is any IEEE 802.11 entity or the equivalent in other related standards, and it may be roaming or stationary. It should be noted that this definition may include APs.

Each of the APs 106 anchors at least a portion of the UAP mesh 108 to the wired network. The APs 106 may be treated as border devices between the wireless switch 104 (or other upstream components of the system 100) and the UAP mesh 108. This enables more efficient use of wireless resources because proxy address resolution protocol (proxy ARP) may be used to enable the APs 106 to answer ARP requests on behalf of a remote device (e.g., a UAP for which an AP serves as an anchor to the wireless switch 104).

In the example of FIG. 1, the UAP mesh 108 is intended to depict a plurality of potentially discrete APs that do not have a wired connection to the wireless switch 104 or to the APs 106. That is why the APs in the wireless mesh are referred to as "untethered." Any station in the UAP mesh 108, whether a UAP or some other wireless station, is anchored to the wireless switch 104 by the AP 106 and zero or more UAPs that make up a chain of nodes from the station to the AP 106. An AP that is closer to the wireless switch 104 in the chain may be referred to as anchoring downstream stations. For any given station, the path from the station to the wireless switch 104 may be referred to as a spanning tree because the UAP mesh 108 should not allow loops for traffic passing between a station and the wireless switch 104.

When a UAP in the UAP mesh 108 is brought online, it will attempt to reach the wireless switch 104 through a path that is optimal. (Note: Although an optimal path is desired, it may or may not be accomplished in practice, depending upon the implemented algorithm and/or environmental factors). There are multiple metrics for measuring the distance of a UAP from one of the APs 106. For example, the metric may be time. That is, the amount of time it takes for a packet to travel between the UAP and the AP anchoring the UAP. Although such a metric may work fine, it will typically vary depending upon environmental factors, such as traffic congestion or degraded received signal strength. For simplicity, the metric used herein is the number of hops between the UAP and the anchoring AP (AAP), with the understanding that this is but one of many potential metrics. Thus, if a UAP is one hop away from the AAP, the UAP may be referred to as a one-hop UAP. In general, a UAP may be referred to as an N-hop UAP where the UAP is N hops from the AAP.

Advantageously, UAPs of the UAP mesh 108 may include an AP-local switching engine embodied in a computer-readable medium. An AP-local switching engine may make use of a station switching record (SSR) to determine how to switch a given message unit (e.g., a packet, frame, datagram, etc.). This enables at least some traffic to be efficiently switched within the UAP mesh 108. Moreover, advantageously, some traffic may be tunneled back to a switch, while other traffic is locally switched. Which traffic is tunneled back, and which traffic is locally switched, is an implementation-specific decision that becomes available by using the teachings described herein.

It will be appreciated in light of the description provided herein that although aspects of the invention are described relative to IEEE 802.11 standards, and that certain embodiments have particular features that are implemented within the 802.11 context, the invention itself is not limited to 802.11 networks and may generally be applied to any applicable wireless network; and to the extent that future technological enhancements might obscure the distinctions between wireless switches, APs, and/or stations, the invention is understood to include components providing the features of such switches, APs, and stations independently of how they are packaged, combined, or labeled.

In an illustrative embodiment, the UAP mesh 108 is created from a spanning tree. Each station in the UAP mesh 108 attempts to reach the wireless switch 104 along an optimal path. Assuming the optimal path is measured in the number of hops to the wire, if a first station's traffic passes through a UAP and along a path from there to the wire, a second station's traffic that passes through the UAP will take the same path from there to the wire. Since all stations take the optimal path, the stations may be represented as edge nodes of a tree where the AP at the wire is the root node. Thus, the AP mesh acts as a spanning tree for each station. It may be noted that the spanning tree is greedy at each node, which naturally results in an efficient (perhaps even optimized) tree flow.

Figure 2:
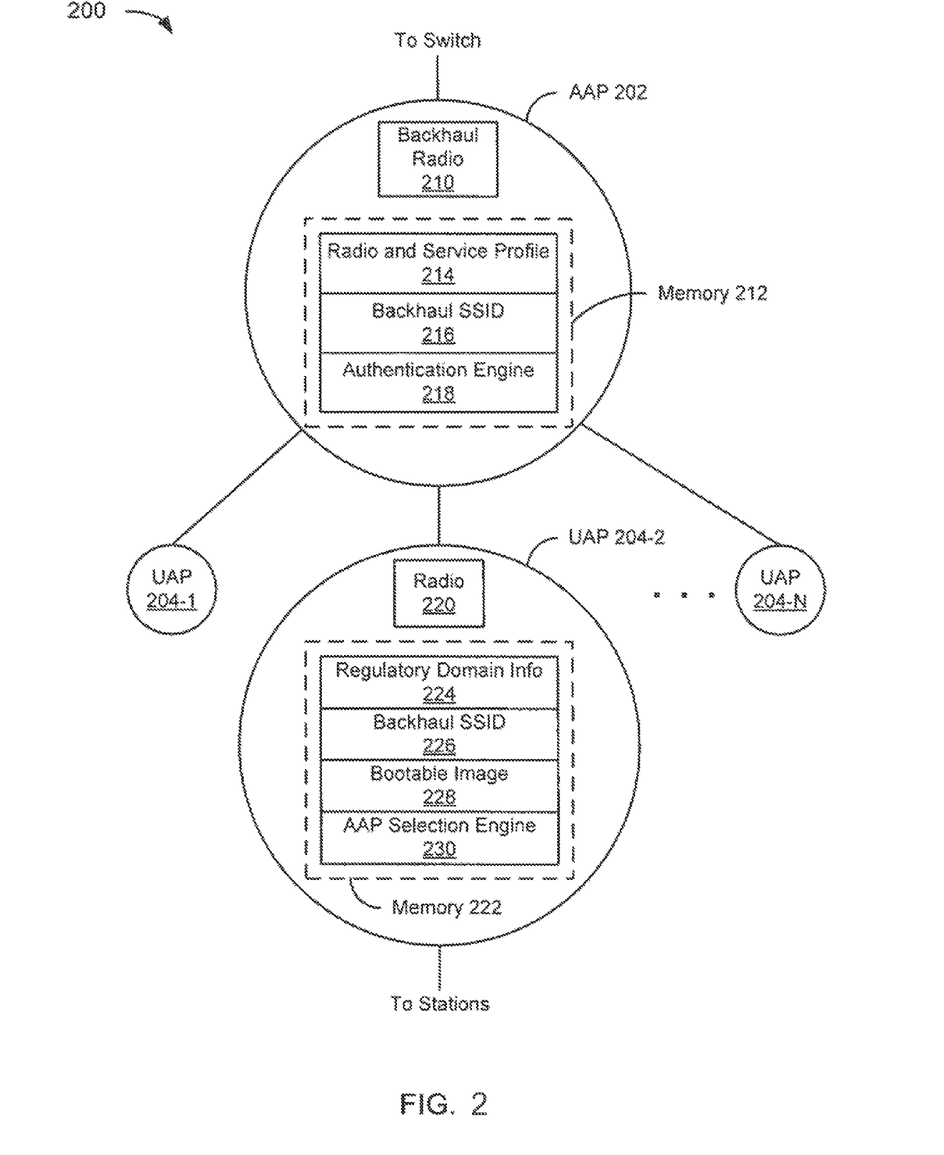
FIG. 2 depicts an example of a subtree of a UAP mesh.

FIG. 2 depicts an example of a subtree 200 of a UAP mesh. The subtree 200 includes an anchor AP (AAP) 202, and one or more UAPs 204-1 to 204-N (referred to collectively as UAPs 204). The path upstream from the AAP 202 to the switch may include no hops, if the AAP 202 is a (tethered) AP; one hop, if the AAP 202 is wirelessly coupled directly to a (tethered) AP, or a chain of UAP nodes; or multiple hops, if the path from the AAP 202 to the switch includes a chain of UAPs. The path downstream from the UAP 204-2 may include multiple jumps, as well. However, it should be noted that if the stations are not wirelessly coupled directly to the UAP 204-2, the UAP 204-2 is actually an AAP (i.e., the UAP 204-2 would be anchoring downstream UAPs).

In the example of FIG. 2, the AAP 202 includes a backhaul radio 210 and memory 212. The number of UAPs 204 that are anchored by the AAP 202 may be implementation- or embodiment-specific. For example, a particular installation may limit the number of UAPs 204 to, e.g., five.

The backhaul radio 210 may be a radio that is dedicated to transmitting data associated with the UAPs 204. Whether the radio is dedicated to backhauling is an implementation-specific decision. Since there may be multiple radio and SSID configurations per radio-profile, the radio may be used to perform both the backhaul function and other, e.g., 802.11 services. However, it is expected that many customers who implement backhaul services will dedicate a radio to backhaul services because the backhaul link is an important one. In an illustrative embodiment, the backhaul radio 210 is capable of passive scan and active scan. However, it should be noted that in some implementations, best practice may advice against active scan. The channel and power settings are often hard configured so auto-tuning may not be available and may even be undesirable. The ability to change the backhaul channel and force all UAPs to do likewise without dropping any sessions would potentially make auto-tuning more viable. The AAP 202 may or may not include one or more radios (not shown) in addition to the backhaul radio 210.

The memory 212 includes a plurality of modules, some of which are depicted in FIG. 2 for illustrative purposes. A processor (not shown) is coupled to the memory 212 in a manner that is well-known in the relevant arts. The memory 212 is intended to represent any of a plurality of known or convenient computer-readable mediums, including non-volatile storage, RAM, flash memory, cache, etc. Any applicable computer-readable medium may be used.

In the example of FIG. 2, the memory 212 includes a backhaul radio and service profile module 214, a backhaul service set identifier (SSID) 216, and an authentication engine 218. The backhaul radio and service profile module 214 includes data to be used in association with the backhaul. The backhaul SSID 216 identifies the support network. The authentication engine 218 facilitates authentication of wireless stations (including UAPs). In an illustrative embodiment, the authentication engine 218 authenticates a station in concert with a switch or other upstream component. The station or upstream component may assist in the authentication "on the fly" when a wireless station attempts to associate with the AAP 202, or in advance for a pre-authorized wireless station. In an embodiment that does not have (or has more limited) centralized management, the authentication engine 218 could even be configured to authenticate without the assistance of a switch or other upstream component.

The AAP 202 may be configured to beacon the backhaul SSID 216. The service profile is then associated to a radio profile and AP following known or convenient conventions. Since backhaul services will be applied to specific APs in at least one embodiment, general AP-configuration policies (such as auto-dap templates) that can apply to unspecific APs are not enabled in this embodiment. They may be enabled in other embodiments, however.

In the example of FIG. 2, the UAP 204-2 includes a radio 220 and memory 222. Details of other ones of the UAPs 204 are omitted to avoid cluttering the figure. Each of the UAPs 204 may be identical to, similar to, or different from the UAP 204-2. The radio 220 may or may not be a dedicated backhaul radio. The value of making the radio 220 into a dedicated backhaul radio diminishes if the UAP 204-2 is at the edge of a UAP mesh (e.g., when there are no downstream UAPs), though the value may or may not be diminished to zero.

The memory 222 includes regulatory domain information 224, a backhaul SSID 226, a bootable image 228, and an AAP selection engine 230. The regulatory domain information 224 provides information to the UAP about allowed broadcast parameters for a given region. The CLI to preconfigure a DAP for untethered operation may include the SSID of the anchor AP and a preshared key (not shown). When the UAP is configured with the backhaul SSID 226, the regulatory domain information 224 should probably be stored in, e.g., flash, as well (as shown). This prevents the UAP from operating outside of the regulatory limits before it receives its complete configuration from the switch. It must be clearly documented that when prestaging UAPs, the regulatory and antenna information is correct and reflects the actual deployment to avoid regulatory violations. The regulatory domain information may be updated with a running configuration.

The bootable image 228 enables the UAP 204-2 to be deployed with the same services as the AAP 202 (though performance could be adversely impacted by the radio link). When the UAP 204-2 is up and running, the boot configuration associated with the bootable image 228 may be changed. When the boot configuration is changed, the UAP 204-2 must be reset for the changes to take effect. It is not always desirable to allow the boot configuration to change. For example, it is possible for a UAP to find a switch running a software version that does not support untethered APs. When the UAP sees than an older version of software is trying to manage it, the UAP may choose to reboot so as to protect its untethered-capable running image. (This may further require that the anchor AP generate a log message when a radio link is created or destroyed so that link flapping can be identified and, hopefully, remedied.)

The AAP selection engine 230 enables the UAP 204-2 to select an AAP from a plurality of potential AAPs. Any known or convenient algorithm may be implemented to choose an AAP. For example, the AAP may be selected by comparing relative signal strengths and choosing the strongest. Alternatively or in addition, each AAP could broadcast an estimated time to wire, or number of hops to wire, which the AAP selection engine 230 can use to choose an optimal AAP. In a non-limiting embodiment, the implemented algorithm is greedy at the UAP 204-2.

In a non-limiting embodiment, if the UAP 204-2 is unable to associate with the AAP 202, the UAP 204-2 may beacon an SOS signal, including its serial number. The beacon signal is (hopefully) received at an AP, and sent to the wired network for processing (e.g, at a wireless switch). If appropriate, the upstream component may provide the AAP 202 (or some other AP within range of the UAP 204-2) with data and/or instructions to facilitate an association.

Figure 3:
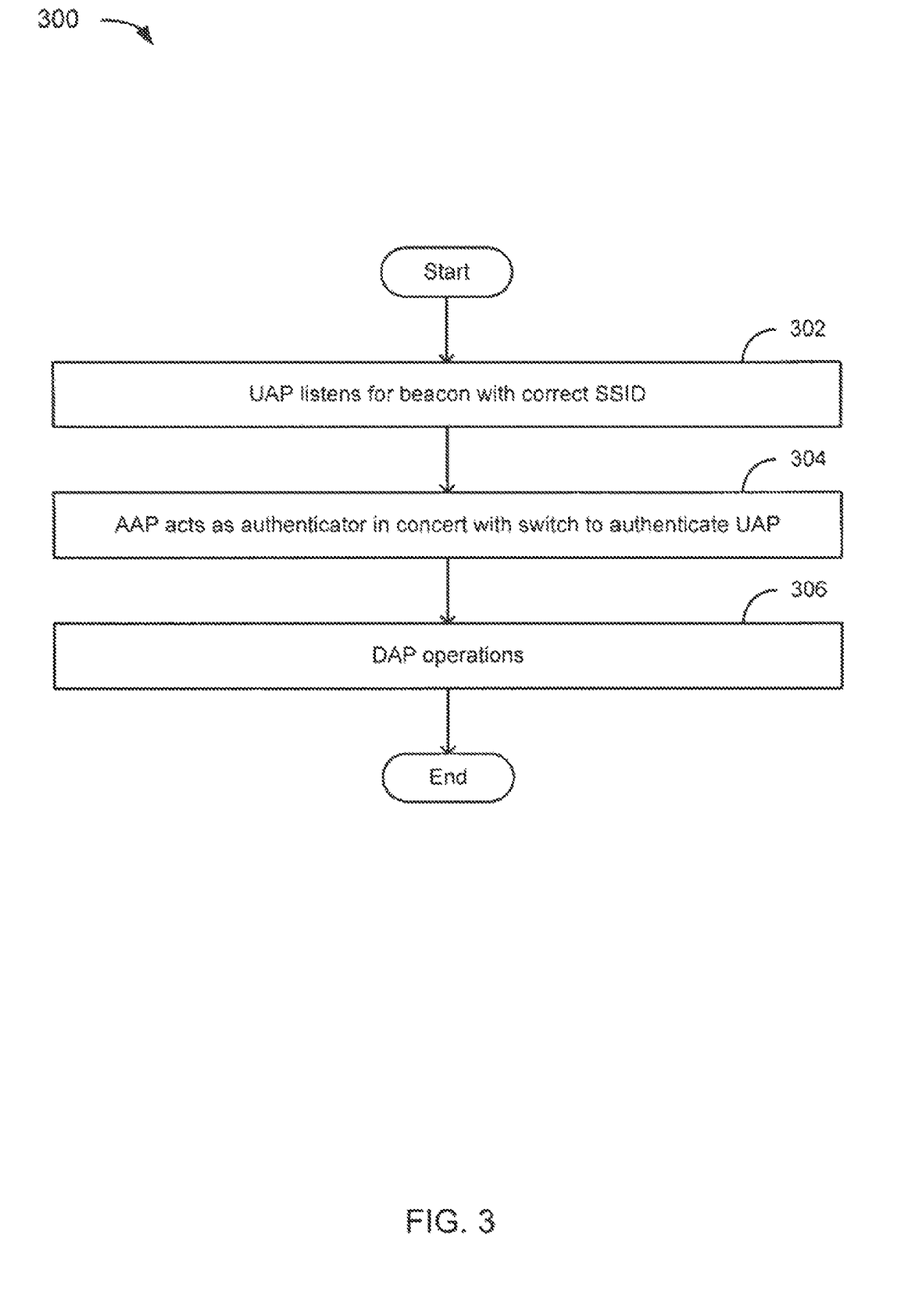
FIG. 3 depicts a flowchart of an example of a method for linking a UAP to an anchoring access point (AAP).

FIG. 3 depicts a flowchart 300 of an example of a method for linking a UAP to an AAP. In the example of FIG. 3, the flowchart 300 starts at module 302 where a UAP listens for a beacon with a correct SSID. To know whether an SSID is correct, the UAP must either have the SSID stored in memory, or be informed in some other manner. The UAP will associate to the AAP, at which point (or perhaps after authentication) the UAP will have layer 2 connectivity to the AAP. In order for the associated radio link to be established, the AAP acts as an anchor point and the UAP acts as a client device.

In the example of FIG. 3, the flowchart 300 continues to module 304 where the AAP acts as an authenticator in concert with a switch to authenticate the UAP. Implementation of this technique may be based on wpa_supplicant under a BSD license including minimum eap methods. Although wpa_supplicant and WPA-PSK may be used to authenticate, this is an implementation-specific choice; any known or convenient technique that works for the intended purpose may be used.

In the example of FIG. 3, the flowchart 300 continues to module 306 where DAP operations are carried out. This may include DAP+TAPA protocols, including optional switch-AP security. At this point, the flowchart 300 ends, though if the DAP operations end, the flowchart 300 could resume at any point (i.e., module 302, 304, or 306).

Figure 4:
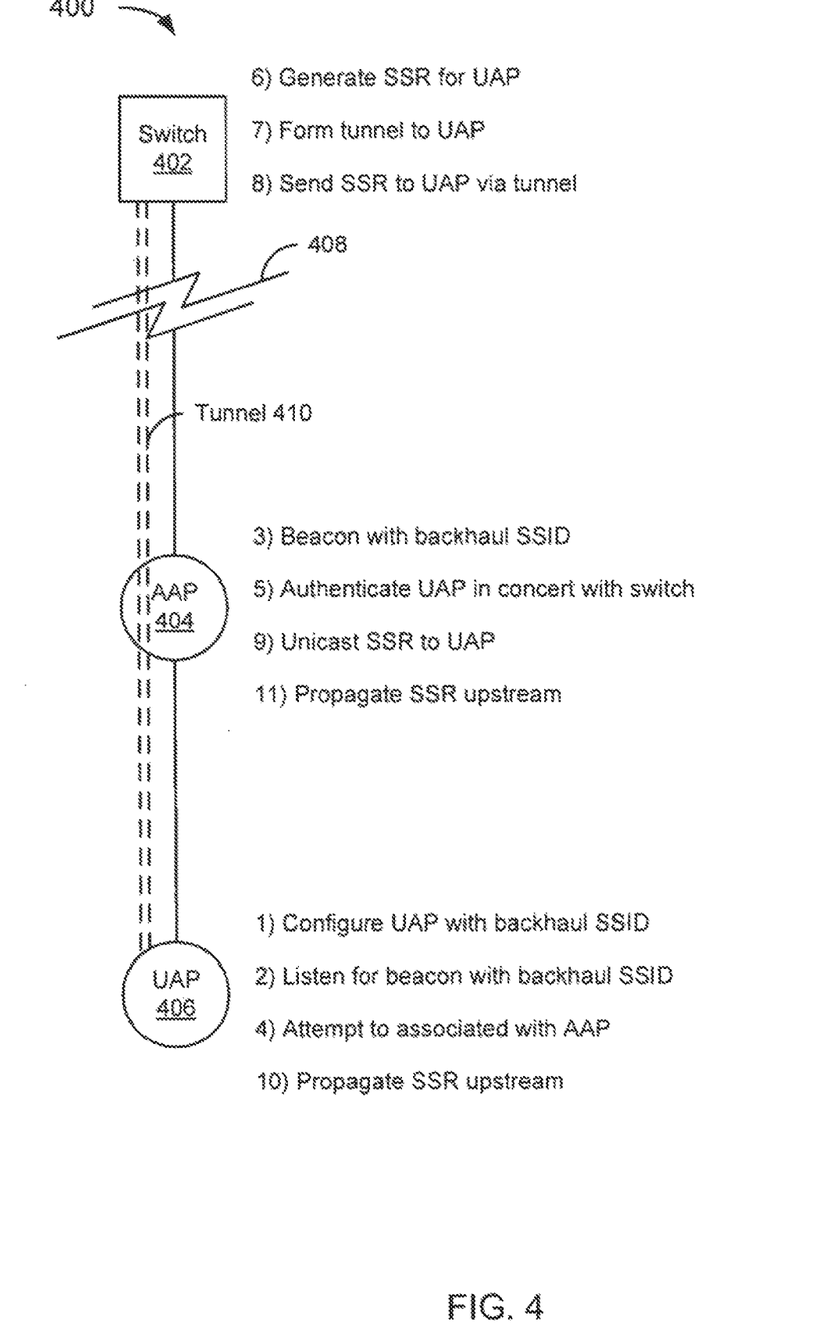
FIG. 4 depicts a diagram illustrating a UAP linking to an existing wireless network.

FIG. 4 depicts a diagram 400 illustrating a UAP linking to an existing wireless network. The diagram 400 includes a switch 402, an AAP 404, and a UAP 406. The switch 402 may be similar to the wireless switch 104 (FIG. 1). The break 408 is intended to represent the case where the AAP 404 is untethered so that there are additional nodes (e.g., a tethered AP) between the AAP 404 and the switch 402. However, in an alternative, the AAP 404 may itself be a tethered AP wire connected to the switch 402. The UAP 406 is initially not linked to the AAP 404, but becomes linked as described below.

The UAP 406 is 1) configured with a backhaul SSID. While this is not a strict requirement, it is a convenience for those who are responsible for installing or placing the UAP within a UAP mesh. Conceivably, the UAP could be configured to receive an SSID over the air or acquire an SSID in some other manner.

The UAP 406 is powered up and 2) listens for a beacon with a backhaul SSID. Again, this is not a strict requirement. It is believed to be more convenient to have the UAP 406 listen for a beacon than to have the UAP initiate a link prior to or instead of receiving a beacon. This is at least in part due to standard practice in 802.11 systems, though such a practice may not be prevalent or even desired in other wireless systems.

The AAP 404 3) broadcasts a beacon with the backhaul SSID. The backhaul SSID may be preconfigured at the AAP 404 or could be received at the AAP 404 from the switch at boot time or after.

The UAP 406 4) attempts to associate with the AAP 404 upon matching the broadcast backhaul SSID with the backhaul SSID stored locally. It may be noted that the backhaul SSID of the UAP 406 is assumed to be the same as that of the broadcast backhaul SSID. However, there may be other UAPs that are within range of the AAP 404 that have different backhaul SSIDs (perhaps associated with a different AAP). Also, a single AAP could conceivably have multiple backhaul radios, each associated with a different backhaul SSID, or even a single backhaul radio associated with multiple backhaul SSIDs.

The AAP 404 5) authenticates the UAP 406 in concert with the switch 402. The UAP 406 may be able to form a layer 2 connection with the AAP 404 when it associates, but the AAP 404 will likely not allow traffic to flow upstream until authentication is complete. While this is not a strict requirement, wireless resources are often relatively scarce, so, in an effort to conserve resources in the case where the UAP 406 is unable to be authenticated, it may be desirable to restrict traffic flow until authentication is complete.

The switch 402 6) generates an SSR for the UAP 406. Since the AAP 404 authenticates the UAP 406 in concert with the switch 402, the switch 402 knows about the UAP 406. So the switch 402 is capable of producing an SSR for the UAP 406. In an embodiment, the SSR includes data associated with authorized stations and access control list (ACL) filters. An ACL refers to rules that typically detail service ports or the like that are available on a host or other layer 3 device, each with a list of hosts and/or networks permitted to use the service. ACLs can be configured to control upstream and downstream traffic. (In this context, they are similar to firewalls.) Typically, servers and routers have network ACLs, but in an illustrative embodiment, ACL rules are provided to APs. The SSR enables the UAP 406 to switch at least some traffic, thereby reducing the amount of traffic that has to be switched higher upstream. Advantageously, this pushes message filtering to the edges (or root) of the UAP mesh.

The switch 402 7) forms a control channel 410 to the UAP 406. It should be noted that the control channel 410 may simply be a virtual "tunnel" in that tables at each hop along the path to the UAP 406 identify the next hop. This is advantageous because it avoids flooding the UAP mesh, which is wasteful of wireless resources. It should be noted that the control channel 410 is not a "tunnel" in the traditional sense because a tunnel is used to carry user data, which is not necessarily the case here.

The switch 402 8) sends the SSR to the UAP 406 via the control channel 410.

The AAP 404 9) unicasts the SSR to the UAP 406. In a non-limiting embodiment, this type of action actually occurs at each hop along the path. The SSR is "unicast" because the AAP 404 knows that the destination of the message is the UAP 406, and any other UAPs (now shown) that are listening to the AAP 404 know the destination is not them or downstream from them.

The UAP 406 10) receives the SSR and propagates the SSR upstream. That is, the SSR is stored at the UAP 406, then sent to the next hop closer to the switch 402. Traffic associated with the UAP 406 can travel upstream as the SSR is propagated.

The AAP 404 11) receives the SSR and propagates the SSR upstream. This occurs at other nodes along the UAP chain up to and including the anchoring (tethered) AP.

Figure 5:
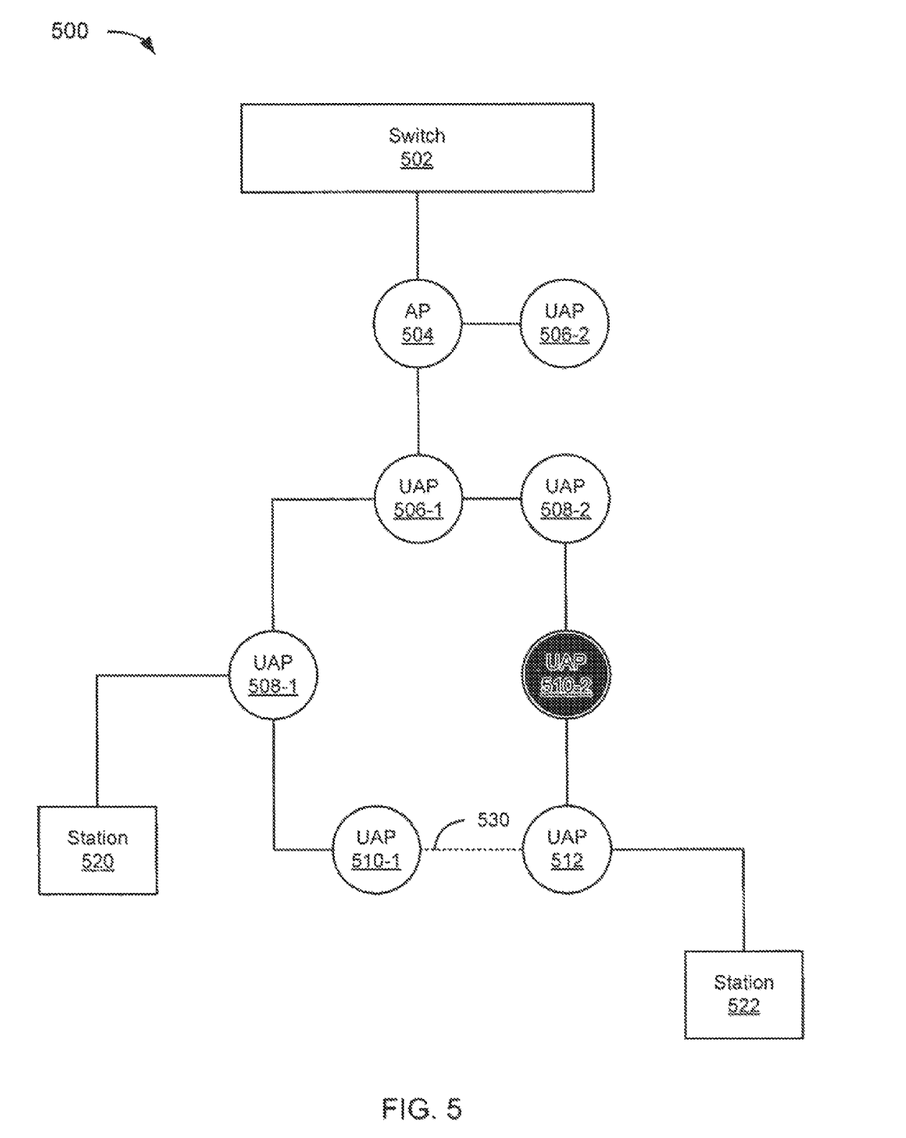
FIG. 5 depicts an example of a system including a self-healing UAP mesh.

FIG. 5 depicts an example of a system 500, including a self-healing UAP mesh. In the example of FIG. 5, the system 500 includes a switch 502, an AP 504, UAPs 506-1 and 506-2 (referred to collectively as "one-hop UAPs 506"), UAPs 508-1 and 508-2 (referred to collectively as "two-hop UAPs 508"), UAPs 510-1 and 510-2 (referred to collectively as "three-hop UAPs 510"), a UAP 512, a station 520, and a station 522.

Initially, it is assumed that each UAP is authenticated and has a valid SSR. The SSRs facilitate at least some switching capability within the UAP mesh. For example, if the station 520 sends a packet to the station 522, the packet travels upstream to the UAP 508-1, then to the UAP 506-1. The UAP 506-1 knows that the destination (station 522) is downstream. Accordingly, rather than sending the packet upstream to the switch 502, the UAP 506-1 makes use of the limited data included in the SSR to send the packet downstream to the UAP 508-2, which sends the packet to the UAP 510-2, which sends the packet to the UAP 512, which sends the packet to the station 522.

The UAP mesh is self-healing in that if a node goes down, only the affected UAPs need to update. Specifically, say the UAP 510-2 goes down. (This is represented in the example of FIG. 5 by the shading of the UAP 510-2.) When the UAP 510-2 goes down, it causes several problems, including 1) the station 522 is no longer associated with a UAP that can forward messages to and from the station 522; 2) the UAP 508-2 and other upstream nodes (e.g., the UAP 506-1) have incorrect data.

Problem 1) can be remedied in the following manner.

1.1) The UAP 512 detects a link failure between itself and the UAP 510-2 because, for the purpose of example, the UAP 510-2 is assumed to have gone down.

1.2) The UAP 512 establishes a link with the UAP 510-1. The new link is represented in the example of FIG. 5 as a dotted line 530. It may be noted that the UAP 512 may have multiple choices of UAPs, though in the example of FIG. 5, only the available UAP 510-1 is depicted. (Presumably, if one of the two-hop UAPs 508 were within range of the UAP 512, the UAP 512 would not have been linked with the UAP 510-2, which is a three-hop UAP. Accordingly, it is assumed that only the UAP 510-1 is in range of the UAP 512.)

1.3) The UAP 510-1 sends a message to the switch 502, alerting the switch 502 that a new SSR is needed because the station 522—and any other stations downstream from UAP 512 (not shown)—is now reachable via a new path.

1.4) The switch 502 sends an SSR downstream to the UAP 510-1. Relevant data from the SSR is propagated at each node, either as the SSR is passed down or by propagation upstream from the UAP 510-1, as has been described previously. Depending upon the implementation and/or embodiment, since the UAP 512 already knows about each station associated with it, and can update upstream routing data locally, the UAP 512 need not necessarily receive the newly sent SSR because the downstream paths remain unbroken, and the upstream path is established through the link to the UAP 510-1.

It may be noted that part of problem 2 is already solved in addressing problem 1. Specifically, the UAP 506-1 has been updated correctly as the SSR is propagated at each node (if applicable). However, the UAP 508-2 still includes incorrect data. Problem 2 can be fully remedied in the following manner:

2.1) The UAP 508-2 detects a link failure between itself and the UAP 510-2.

2.2) The UAP 508-2 waits for a timeout period. Waiting for a timeout period may be important for ensuring that the station 522 maintains connectivity with the switch 502. Specifically, if the UAP 508-2 deletes the data associated with the UAP 510-2 (and therefore data associated with downstream nodes, including the UAP 512 and the station 522), and sends the update upstream, upstream nodes will also delete the data. Eventually the update will reach the switch 502, which will update records to show that stations downstream from the UAP 510-2, including the station 522, are now disassociated. By waiting for a timeout period, the UAP 510-1 can update appropriately, before any disassociation, to ensure continuous connectivity (and, e.g., a smooth handoff).

2.3) The UAP 508-2 deletes the data associated with the UAP 510-2 (necessarily including data associated with the station 522). Since the UAP 508-2 waited for a timeout period, the UAP 510-1 has presumably updated the switch 502, and an SSR and/or other data has been propagated along the path between the switch 502 and the UAP 512. Accordingly, the UAP 506-1—and, more generally, all APs on the path between the UAP 512 and the switch 502—will have current data. Therefore, it is not desirable for the update from the UAP 508-2 (deleting the UAP 510-2 and nodes downstream from UAP 510-2) to be implemented at any of the newly updated nodes because the update will or could (depending upon the implementation) delete good data. In an illustrative embodiment, sequence numbers for updates may be used. Specifically, the sequence number associated with the deletion of the data at the UAP 508-2 should be before the sequence number associated with the update at the UAP 510-1. In this way, when the UAP 506-1 receives an update from the UAP 508-2 to delete data, the UAP 506-1 can check the sequence number of the update and, noticing that the sequence number is before the sequence number associated with the latest update, ignore the update. Advantageously, when a UAP notices that the sequence number comes before a most recent update, the UAP can drop the old update; all upstream nodes will have the correct data so the update need not be passed upstream.

After the UAP 512 is linked back into the UAP mesh via the link 530, the switching functionality of the mesh is also updated. So, if the station 520 sends a packet to the station 522, the packet may be sent up to the UAP 508-1, which recognizes that the station 522 is downstream. Then the UAP 508-1 sends the packet downstream to UAP 510-1, which sends the packet to the UAP 512, which sends the packet to the station 522.

As used herein, an AP may refer to a standard (tethered) AP or to a UAP. Where a distinction should be drawn, an AP may be referred to as a "(tethered) AP" or a "UAP," as appropriate.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

We claim:

1. An apparatus, comprising:
   an anchor access point (AAP) selection engine included within an untethered access point (UAP) that (1) is configured to be operatively coupled to a radio, (2) is associated with a stored backhaul service set identifier (SSID) stored in a computer-readable medium, and (3) is configured to send messages to an AAP such that the AAP sends the messages upstream using a backhaul radio and service profile, the AAP selection engine configured to associate, via the radio, with the AAP if a beaconed backhaul SSID of the AAP matches the stored backhaul SSID.

2. The apparatus of claim 1, wherein:
the UAP is configured to store a bootable image, and
the UAP is configured to boot up using the bootable image.

3. The apparatus of claim 1, wherein the UAP is configured to use regulatory domain information to operate the UAP within regulatory limits before receiving a complete configuration.

4. The apparatus of claim 1, wherein the AAP selection engine is configured to listen for a beacon from the AAP that includes the beaconed backhaul SSID.

5. The apparatus of claim 1, wherein the AAP is associated with a backhaul SSID, the backhaul SSID is the beaconed backhaul SSID.

6. The apparatus of claim 1, wherein the UAP is configured to be authenticated by an authentication engine of the AAP.

7. The apparatus of claim 1, wherein the UAP is configured to store a shared key.

8. A method, comprising:
booting the UAP from a bootable image stored at the UAP;
receiving, at an untethered access point (UAP) and from an anchor access point (AAP), a beacon including a backhaul service set identifier (SSID);
comparing the backhaul SSID included in the beacon to a backhaul SSID stored in the UAP; and
connecting, to a switch, via the AAP when the backhaul SSID included in the beacon matches the backhaul SSID stored in the UAP.

9. The method of claim 8, wherein the UAP is connected to the switch via AAP with a layer-2 connection.

10. The method of claim 8, further comprising using regulatory domain information to operate within regulatory limits before receiving a complete configuration.

11. The method of claim 8, wherein connecting via the AAP further includes receiving an indication that the UAP was authenticated by the AAP using a shared key.

12. An apparatus, comprising:
an anchor access point (AAP) configured to broadcast a backhaul service set identifier (SSID),
the AAP configured to authenticate, via an authentication engine, an untethered access point (UAP) that has (1) matched a stored backhaul SSID to the broadcasted backhaul SSID, and (2) associated, in response to the matching, with the AAP to connect to a network,
the AAP configured to allow the UAP to perform directory protocol operations at the AAP.

13. The apparatus of claim 12, wherein the AAP is configured to transmit regulatory domain information to the UAP.

14. The apparatus of claim 12, wherein the AAP further including a backhaul radio configured to send messaged from the UAP upstream using the backhaul radio and a service profile of the AAP.

15. The apparatus of claim 12, wherein the AAP is configured to anchor the UAP and a limited number of additional UAPs.

16. The apparatus of claim 12, wherein:
the UAP is a first UAP,
the AAP is a second UAP.

17. The apparatus of claim 12, wherein the AAP is further configured to allow a layer-2 connection between the UAP and a switch.

* * * * *